United States Patent
Ko

(10) Patent No.: US 11,743,691 B2
(45) Date of Patent: Aug. 29, 2023

(54) METHOD, NODE FOR PROCESSING MESSAGES WITHIN AN IOT NETWORK AND NETWORK PACKET THEREOF

(71) Applicant: PIXART IMAGING INC., Hsin-Chu (TW)

(72) Inventor: Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 59 days.

(21) Appl. No.: 17/677,022

(22) Filed: Feb. 22, 2022

(65) Prior Publication Data
US 2022/0182794 A1    Jun. 9, 2022

Related U.S. Application Data

(63) Continuation of application No. 16/558,433, filed on Sep. 3, 2019, now abandoned.

(51) Int. Cl.
| | | |
|---|---|---|
| *H04W 4/00* | (2018.01) | |
| *H04W 4/06* | (2009.01) | |
| *H04W 4/90* | (2018.01) | |
| *H04W 4/12* | (2009.01) | |
| H04W 84/18 | (2009.01) | |

(52) U.S. Cl.
CPC ............ *H04W 4/06* (2013.01); *H04W 4/12* (2013.01); *H04W 4/90* (2018.02); *H04W 84/18* (2013.01)

(58) Field of Classification Search
CPC ......... H04W 4/40; H04W 4/46; H04W 28/08; H04W 28/0875; H04W 76/23
See application file for complete search history.

(56) References Cited

U.S. PATENT DOCUMENTS

| | | | |
|---|---|---|---|
| 2014/0269465 A1* | 9/2014 | Ballantyne | H04L 67/62 370/312 |
| 2015/0143516 A1 | 5/2015 | Sharpe et al. | |
| 2015/0172791 A1 | 6/2015 | Yamauchi et al. | |
| 2017/0126522 A1 | 5/2017 | McCann et al. | |
| 2018/0033275 A1 | 2/2018 | Ginsberg et al. | |
| 2019/0268775 A1* | 8/2019 | McDaid | H04L 63/1425 |

FOREIGN PATENT DOCUMENTS

CN      106781570 A     5/2017

\* cited by examiner

*Primary Examiner* — Bo Hui A Zhu
(74) *Attorney, Agent, or Firm* — Li & Cai Intellectual Property (USA) Office

(57) ABSTRACT

A method and node for processing messages within an Internet of Things (IoT) network and network packet thereof are provided. Multiple fields of a header of a network packet broadcasted over the IoT network are referred to in the method. When a node receives a network packet broadcasted over the IOT network, it checks if the node's ID is recorded in an ID field of the network packet. The node ID is added to the network packet if the network packet does not record the node ID, and the network packet is then broadcasted to the IOT network; otherwise, the network packet is not broadcasted if the node ID has been recorded in the ID field. The node also performs a function indicated in a function field of the network packet when the node ID is not recorded in the network packet.

8 Claims, 9 Drawing Sheets

METHOD, NODE FOR PROCESSING MESSAGES WITHIN AN IOT NETWORK AND NETWORK PACKET THEREOF

CROSS REFERENCE TO RELATED APPLICATION

This application is a continuation application of U.S. application Ser. No. 16/558,433, filed on Sep. 3, 2019, and entitled "METHOD, NODE FOR PROCESSING MESSAGES WITHIN AN IOT NETWORK AND NETWORK PACKET THEREOF", the entire contents of which are hereby incorporated by reference.

FIELD OF THE DISCLOSURE

The disclosure is related to a technology for processing messages within an IOT network, and in particular to utilizing one or more notation fields of network packets propagated within the IOT network to instruct a node to perform corresponding one or more actions.

BACKGROUND OF THE DISCLOSURE

An Internet of Things (IoT) refers to a plurality of interconnected identifiable devices, and each of which supports a specific communication protocol and acts as a node within a network.

A conventional IoT system generally includes a central host and a plurality of nodes that are interconnected by a specific communication protocol. Each of the nodes may be responsible for performing one specific function. For example, the IoT system includes a smoke sensor as one of the nodes, and the central host may be informed with a warning message if the smoke sensor senses any unusual event. Further, an imaging sensor that acts as a monitoring node within the IoT system is provided to produce images continuously, and the images will be uploaded to the central host of the system over the network.

Surveillance is a known application of the IoT system. A surveillance system utilizes a variety of devices such as a surveillance camera, a motion sensor, and an access control device to detect various events around an environment. In the surveillance system, the surveillance devices should be on long-term standby for receiving signals at any time, and are also required to maintain a long-term connection for receiving signals at any time from the central host or other devices.

SUMMARY OF THE DISCLOSURE

The disclosure generally relates to a method for processing messages within an Internet of Things (IoT) system, a node within the IoT system, and a network packet thereof that is defined for instructing the node to perform certain actions.

In an aspect of the disclosure, a network packet propagated over an IoT network is defined by the IoT system which includes a host and a plurality of nodes. In the IoT system, each of the plurality of nodes communicates with the host via a first wireless communication protocol, and the plurality of node are communicated with each other via a second wireless communication protocol. Multiple fields in a header of the network packet propagated among the nodes include: a source field that records a source of the network packet, a destination field that records a destination of the network packet, an ID field that records a node ID of the node that receives or transmits the network packet; and a function field that indicates a function that is performed by the node when receiving the network packet. The header further includes a counting field that records a counting value that is used to check if a threshold is reached, and a threshold field that records the threshold.

According to the information of header, the node performs the function indicated in the function field when the node checks that the network packet does not record the node ID of the node. Alternatively, the node performs the function when the counting value does not exceed the threshold.

According to one of the embodiments of the disclosure, a method for processing messages for a node with a node ID within an IOT network including multiple nodes is provided. In the method, the node firstly receives a network packet that is broadcasted over the IOT network, and then analyzes the network packet. The node checks if its node ID is recorded in an ID field in a header of the network packet. After that, the node ID of the node is added into the network packet when it is checked and determined that the network packet does not record the node ID. The network packet is therefore broadcasted.

Otherwise, the network packet is not broadcasted when the node determines that the network packet has already recorded the node ID of the node. In other words, since the network packet has been received by this node, the node ID would be recorded in the network packet.

In another aspect of the disclosure, the node also checks a counting value of a counting field in the network packet and adds one to the counting value before broadcasting the network packet to the IOT network. When the counting value of the counting field reaches a threshold that is recorded in a threshold field in the network packet, the node terminates broadcasting the network packet to the IOT network.

According to another embodiment of the disclosure, in the IoT network, a node that is used perform the method for processing messages recited above is provided. The node includes a controller, a memory that records a node ID of the node, a first wireless communication circuit that performs the first wireless communication protocol for communicating with the host, and a second wireless communication circuit that performs the second wireless communication protocol for communicating with the other one or more nodes and at least one sensor.

In one further aspect of the disclosure, a method for processing messages for the node within the IOT network is provided. In the method, the node receives a network packet broadcasted over the IOT network, checks a counting value recorded in a counting field of a header of the network packet and adds one to the counting value, and broadcasts the network packet to the IOT network when the counting value does not reach a threshold recorded in a threshold field of the header; or terminates the broadcasting of the network packet to the IOT network when the counting value reaches the threshold.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
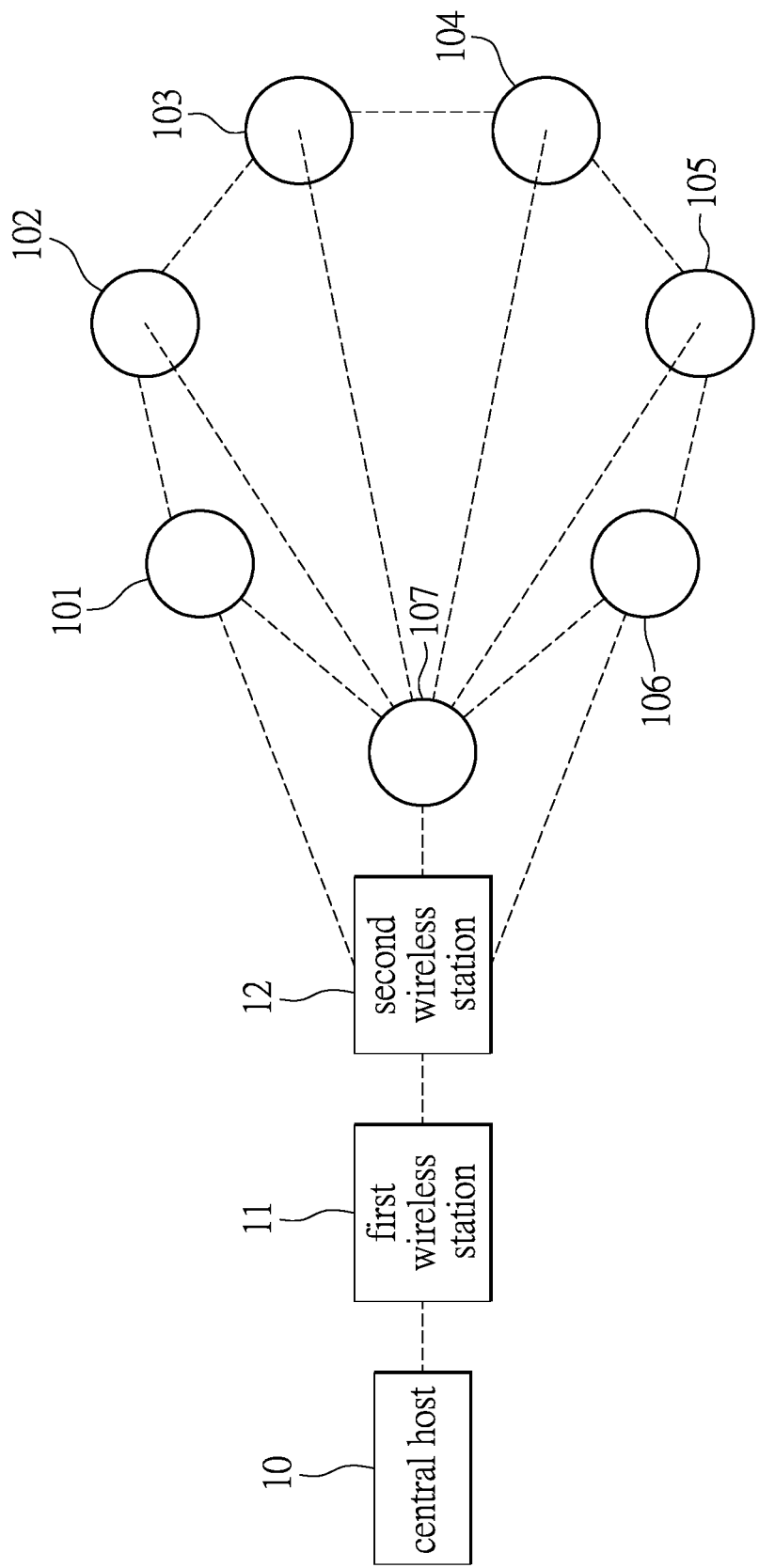
FIG. 1 is a schematic diagram showing a network system that implements the method for processing messages within an Internet of Things network according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In a network system, many devices acting as a plurality of nodes over a network are disposed for performing various functionalities of the system. The plurality of nodes within the network embody an Internet of Things (IoT) network. For example, the plurality of nodes can be a variety of sensor devices of the IoT network that implements a surveillance system. The plurality of nodes can also be various appliances that are interconnected with each other in a smart home. Over the IoT network, the messages generated by the nodes can be exchanged via a specific communication protocol, and can be provided for implementing functionalities for specific purposes. It should be noted that the IoT network may support multiple communication protocols that allow each of the nodes within the IoT network to select one of the communication protocols to conduct transmission according to a condition such as a distance, an instant requirement or data throughput.

Figure 2:
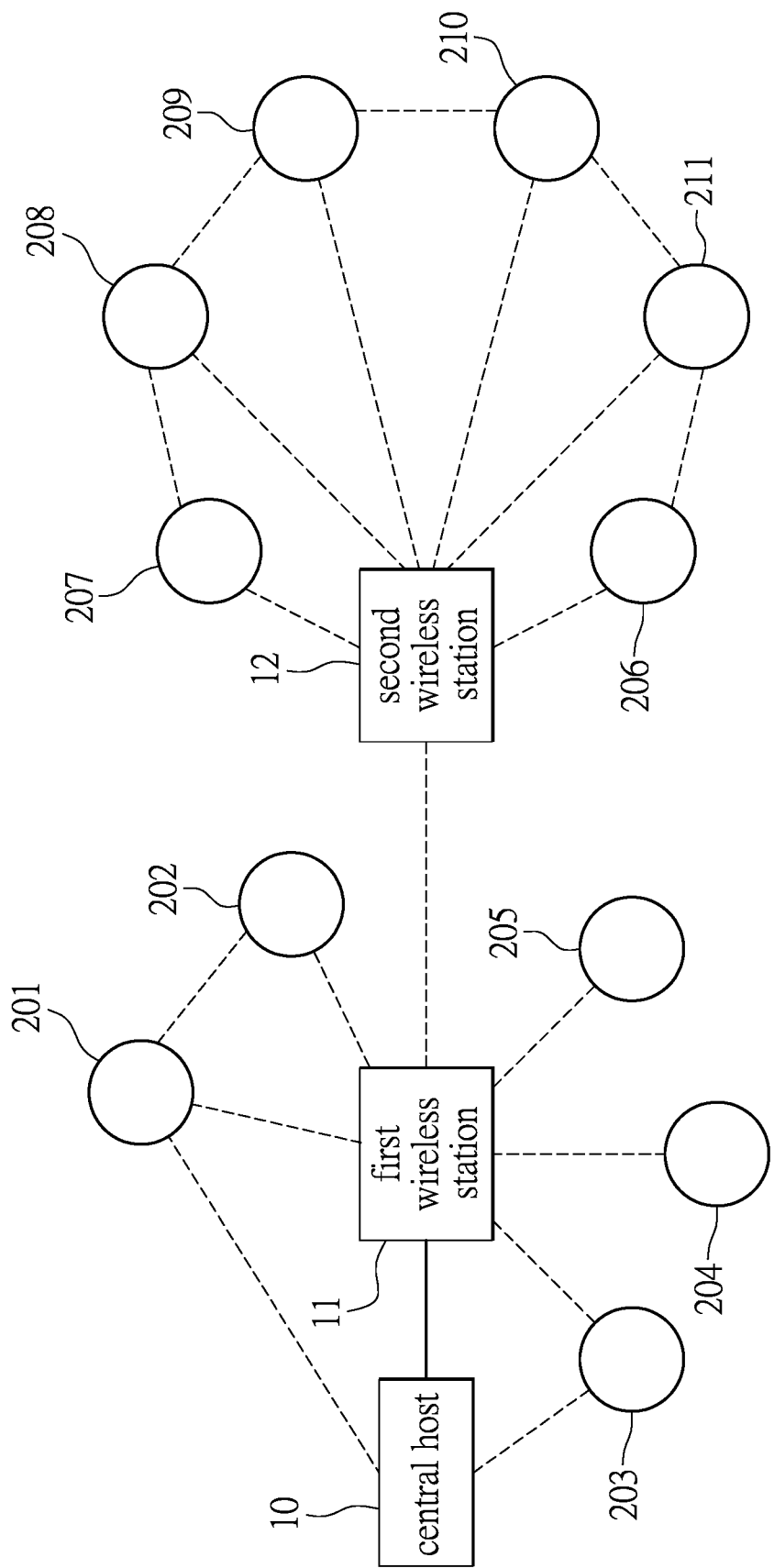
FIG. 2 is another schematic diagram showing the network system that implements the method for processing message within an IoT network according to another embodiment of the present disclosure.

In an aspect of the surveillance system, referring to FIG. 1 or FIG. 2 that exemplarily shows an IoT network with multiple nodes, many sensors are used to monitor various events occurring in a particular area under surveillance. More specifically, the node within the IoT network can be implemented as a motion sensor that utilizes optical, microwave, acoustic sensor or an imaging sensor to detect a moving object within the area under surveillance. Another node can also be implemented as a Passive Infrared Sensor (PIR) camera that is used to identify the moving object by comparing image pixels generated by the camera. Another node can be an imaging sensor that is used to capture images of the area under surveillance. Further, the nodes within the network system can communicate with a central host directly or indirectly via a wireless communication protocol. The data generated by the various nodes can be pre-processed in the nodes or immediately transmitted to the central host for processing. For the purpose of security, a specific software program executed in the central host is used to process the data and announce an alert message or any warning signal once a surveillance event is determined.

FIG. 1 is a schematic diagram showing a network system that implements the method for processing messages within an Internet of Things (IoT) network according to one embodiment of the present disclosure.

A central host 10 is provided for operating/managing the IoT-based system such as the shown IoT network that includes a plurality of nodes. When the central host 10 is disposed in the IoT network, a mechanism is provided to control operation of each of the nodes 101 to 107. For example, the central host 10 may communicate with each of the nodes 101-107 through a base station via a first communication protocol, wherein the base station maybe incorporated into the central host 10. The first communication protocol can be WiFi™ Bluetooth™, cellular network, or other protocols applied to various generations of mobile communication. The central host 10 and the nodes 101 to 107 within IoT network can also be communicated with each other directly via a second communication protocol other than the protocol used by the base station. For example, the second communication protocol can be WiFi, Bluetooth, or other IoT-enabled wireless communication protocols, e.g. ZigBee, Bluetooth Low Energy (BLE), Z-Wave and Near Field Communication (NFC).

It should be noted that the second communication protocol applied for the nodes 101 to 107 generally considers the need for power saving, and the first communication protocol used between the nodes (101~107) and the central host 10 may generally consider the stability of connection and the need for long-distance communication, but are not limited thereto. Some communication protocols, such as WiFi, could be used as the first communication protocol or the second communication protocol with different settings or power consumption modes.

In an exemplary example shown in FIG. 1, a first wireless station 11 is provided as a base station for establishing a connection with the central host 10 and allows the central host 10 to communicate with the nodes 101 to 107 based on the first communication protocol. Under this network topology, a second wireless station 12 as an extend base station is used to create a subnet including the nodes 101 to 107 and provided for establishing connectivity among the nodes 101 to 107. The second wireless station 12 can provide message being transmitted from the central host 10 to the nodes 101-107 or from the nodes 101-107 to the central host 10 via the first communication protocol or the second communication protocol. It should be noticed that if the communication between the second wireless station 12 to the central host 10 is based on the first communication protocol then the message between the second wireless station 12 to the nodes 101~107 should be converted in a specific format suitable for the first communication protocol if the communication between the second wireless station 12 to the nodes 101~107 is based on the second communication protocol.

For example, the central host 10 generates a control instruction that at least records information about a source, a destination, and a function to be performed by a destination node. Then, the control instruction is converted to a network packet being propagated over the IoT network. In an initial circumstance, the source recorded in the instruction can be a source IP of the central host 10, the destination recorded in the instruction can be a destination IP/ID of the destination node, and the task assigned to the destination node is to perform the function. As the network packet is propagated over the IoT network, the information recorded in the packet can be modified if necessary.

One further aspect of the network system for implementing the method for processing messages within an IoT network can be referred to in FIG. 2.

FIG. 2 shows a different aspect of the IoT network where the central host 10 can directly or indirectly communicate with the nodes 201 to 205 via the first wireless station 11 and the nodes 206 to 211 via the second wireless station 12. The nodes 201 to 211 are disposed at different subnets that may be disposed at different areas. In this embodiment, the central host 10, the first wireless station 11 and the second wireless station 12 preferably communicate with each other via the first communication protocol when considering the stability of connection and the need for long-distance communication.

As an example for surveillance system, the nodes 201 to 205 can be sensors disposed at a first surveillance zone, and the nodes 206 to 211 can also be sensors disposed at a second surveillance zone. The central host 10 can be a central controller of the surveillance system for processing data transmitted from each of the nodes 201 to 211.

In an exemplary example, at least one of the nodes 201 to 205 at the first surveillance zone can be a motion sensor. The motion sensor is used for detecting any object entering the first surveillance zone. One of the nodes 201 to 205 at the first surveillance zone can be an imaging sensor. The imaging sensor is used for capturing images of the object being detected by the motion sensor as a moving object entering the first surveillance zone. Therefore, the safety of the first surveillance zone can be ensured by the cooperation of various types of sensors within the IoT network.

Furthermore, the nodes 201 to 205 at the first surveillance zone can also collaborate with the nodes 206 to 211 at the second surveillance zone through the central host 10 for achieving the purpose of security for a wide area. For example, at least one of the nodes 201 to 205 is a motion sensor that generates motion detection signals when detecting an object entering the first surveillance zone. The at least one of the nodes 206 to 210 could be an image sensor capable of capturing images and recording videos. When the central host 10 processes the motion detection signals received from one or more motion sensors and determines a moving object may enter the second surveillance zone, the central host 10 will instruct at least one imaging sensor, e.g. one of the nodes 206 to 211, at the second surveillance zone to capture the images (or record video) of the moving object. It should be noted that the imaging sensor generates a series of images when receiving the control instruction from the central host 10, or receiving the motion detection signal directly from the motion sensor, and the images are transmitted to the central host 10.

Figure 3:
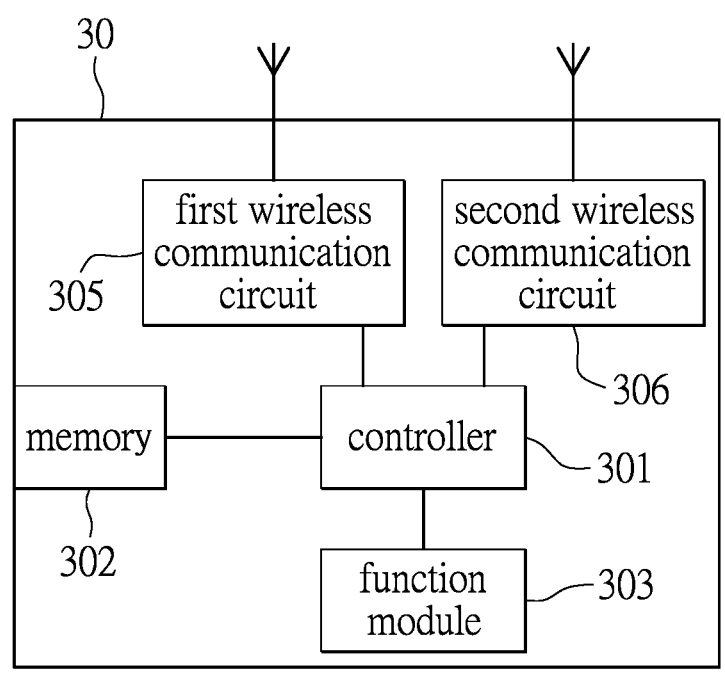
FIG. 3 shows a block diagram depicting a node for processing messages within an IoT network in one embodiment of the present disclosure.

FIG. 3 shows a block diagram depicting one of the nodes shown in the above embodiments of the present disclosure.

A node device 30 of FIG. 3 acts as a node of the IoT system. The main circuit components of the node device 30 include a controller 301, and other circuits electrically connected to the controller 301. For example, a memory 302 electrically connected with the controller 301 is provided for recording information relating to the node device 30. The information recorded in the memory 302 includes a node ID that acts as identification such as an IP address or a MAC (Media Access Control) address used to identify the node device 30 within the network.

The node device 30 includes a function module 303 electrically connected with the controller 301. In an exemplary example of the disclosure, in a surveillance system, the node device 30 is used as a sensor device that may include a motion sensor, an imaging sensor, or some kinds of sensors for sensing environmental change, such as temperature, humidity, smoke or the like. The sensor device also includes a processor that performs the function specified by the function 303. Furthermore, the processor of the sensor device can determines a threshold value for issuing a warning message according to the sensed data generated by the above various sensors in the surveillance system. According to one of the embodiments, the threshold value is used to identify a number of times that the warning message have been issued. Specifically, when the warning message is generated, the warning message can be transmitted to the one or more nodes through a wireless communication circuit.

In detail, the function module 303 includes a sensor element and the related electronic components for performing a corresponding function. In the function module 303, the sensor element is utilized to conduct sensing in order to generate the sensed data and convert the sensed data into signals. When the controller 301 receives the signals, an alert signal may be generated if any abnormal event occurs.

Furthermore, the node device 30 includes two types of communication circuits (305, 306) that are connected with the controller 301 respectively, and are responsible for communication purposes, wherein the communication circuits (305, 306) could be antennas or the like which are capable of transmitting/receiving wireless signals. For example, a first wireless communication circuit 305 of the node device 30 performs a first wireless communication protocol that allows the node device 30 to communicate with an external host, e.g. the central host (10, FIG. 1) through a base station, and a second wireless communication circuit 306 performs a second wireless communication protocol that allows the node device 30 to communicate with the central host 10 or other one or more nodes directly within the IoT network close to the node device 30.

In an IoT system, every node is generally required to work for a long period of time, or be on a long-term standby. Accordingly, the first wireless communication circuit 305 performs a general data transmission protocol such as WiFi™ for transmitting the sensed data to the external host. Different from the first wireless communication circuit 305, the second wireless communication circuit 306 performs the low-power-consumption IoT-enabled communication protocol for communicating with the other nodes via broadcasting packets. Therefore, the node device 30 with the two types of wireless communication circuits (305, 306) can operate more efficiently since it effectively saves the power consumption while still working to receive instant signals for the other nodes.

The node is configured to be in a power saving mode for the purpose of power saving until a waking signal is received. When the node device 30 is a camera sensor, the node device 30 may detect if an object is existed or adjust an exposure parameter of the node device 30 in the power saving mode, and record video (e.g. capturing series of images) in a recording mode. In the recording mode, the node device 30 records the video and then transmits the recorded video to the host by applying the first wireless communication circuit 305. In the power saving mode, the node device 30 applies the second wireless communication circuit 306 to keep listening to the waking signal. For example, the waking signal may be generated by the controller 301 if any abnormal event is determined; or the waking signal may be received from the external host if the external host issues an instruction to the node device 30.

Figure 4:
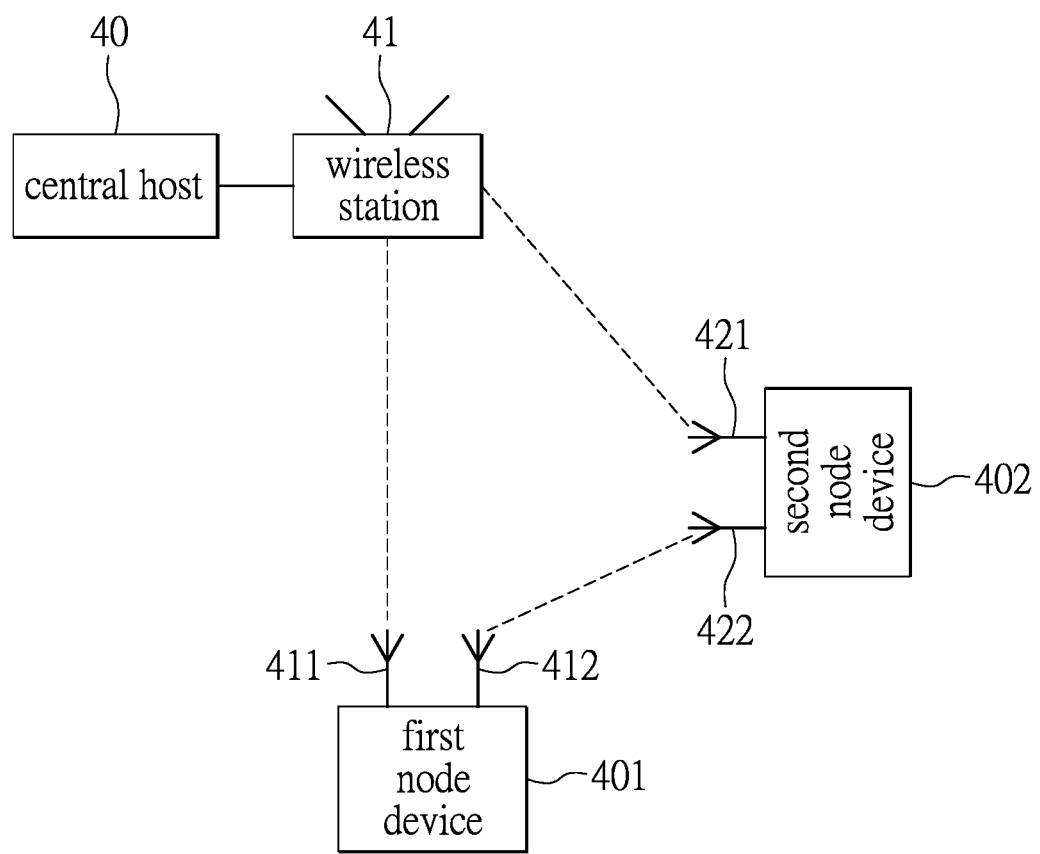
FIG. 4 is a schematic diagram illustrating a circumstance where the nodes are communicated within the IoT network according to one embodiment of the present disclosure.

FIG. 4 is a schematic diagram illustrating a circumstance where the nodes with the two types of wireless communication circuits are communicated with each other.

A central host 40 within an IoT network connects with the nodes such as a first node device 401 and a second node device 402 within the same network via a wireless station 41. The figure shows the first node device 401 and the second node device 402 communicating with the central host 40 via their first antennas 411 and 421 both under a first wireless communication protocol. Further, the first node device 401 is communicated with the second node device 402 via their second antennas 412 and 422 both under a second wireless communication protocol. Through the second antenna 412 with the related electronics of the first node device 401 and the second antenna 422 of the second node device 402, an internal connectivity there-between is established.

In other words, within the IoT network, the various devices, e.g. the host and the nodes, can be communicated with each other directly or indirectly under the same or different communication protocols. The central host 40 establishes connectivity with the plurality of nodes (e.g. 401, 402) via their first antennas (e.g. 411, 421) under the first wireless communication protocol, and the central host 40 issues an instruction that can be broadcasted as network packets to the nodes. The plurality of nodes (e.g. 401, 402) are interconnected via their second antennas (e.g. 412, 422) under the second wireless communication protocol, and the network packets can be broadcasted among the nodes.

Figure 5:
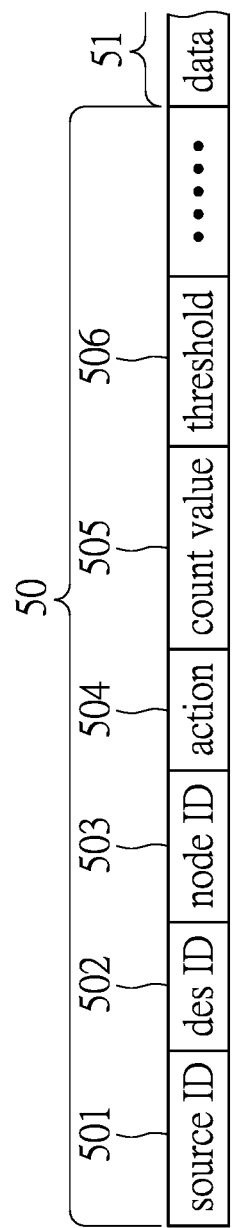
FIG. 5 is a schematic diagram depicting a network packet that is propagated within the IoT network according to one embodiment of the present disclosure.

Reference is made to FIG. 5 which is a schematic diagram depicting a network packet that is propagated within the IoT network according to one embodiment of the present disclosure.

A network packet is configured to be broadcasted over the IoT network and also well defined by the IoT system to be identifiable by the nodes. According to an example shown in FIG. 5, the network packet generally includes a header 50 and data 51.

In general, a header of the network packet is used as an identifier in the IoT system since it records requisite information for the recipient. For example, either a ID field 503 or a destination field 502 is a field of the header 50 and used as an identifier for the node to confirm if the node should perform a function specified in a function field 504. In an aspect of the disclosure, when the ID field 503 has no ID corresponding to the current node which receives the packet, it shows that it is a first time the current node receives the network packet and the current node is configured to perform the function specified in the function field 504. In an another aspect, when the destination ID 502 records an ID corresponding to the current node, it stipulates that the current node needs to perform the function since the current node is the destination identified by the header 50.

The header 50 is defined with multiple fields that at least include a source field 501 that records a source ID of the network packet; the above-mentioned destination field 502 that records a destination ID of the network packet; the ID field 503 that records a node ID of one of the nodes that were receiving or transmitting the network packet; and the function field 504 that indicates a function or an action that is required to be performed by the node when the node receives the network packet. It should be noted that any node receiving this network packet performs a specified function when the node determines that the network packet does not record the node ID of this node in the ID field 503.

Further, the header 50 also includes a counting field 505 that records a counting value that is used to check if a threshold is reached; and a threshold field 506 that records this threshold. It should be noted that any node receiving the network packet performs a specified function when the counting value does not exceed the threshold.

Through the network packet defined by the IoT system, the node within the IoT network can convey messages with other nodes, for example the ID field 503 can be used to determine whether or not the node receiving the network packet performs an action, and the counting field 505 can also be used to determine if the function should be performed or not.

Figure 6:
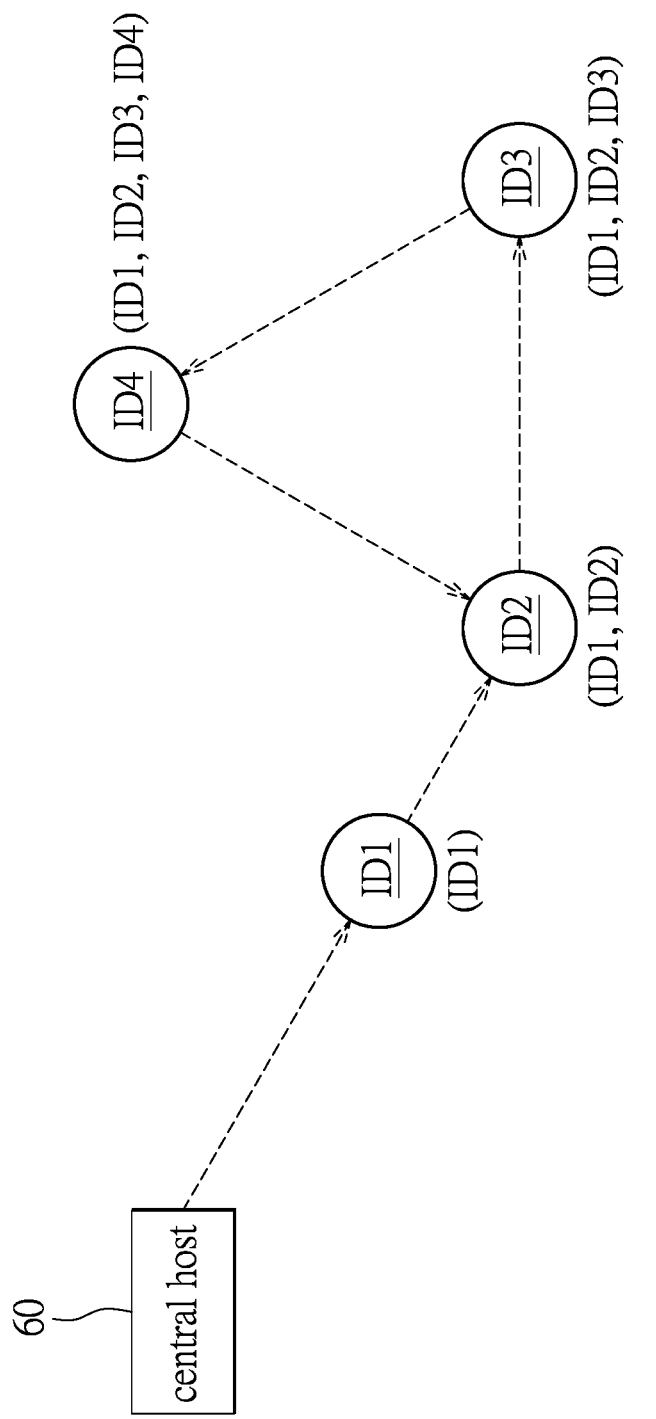
FIG. 6 schematically shows a circumstance where the network packet is broadcasted among nodes within an IoT network in one embodiment of the present disclosure.

As an example for the ID field 503, reference is made to FIG. 6 that schematically shows a circumstance that the network packet is broadcasted among nodes within an IoT network.

A central host 60 within the IoT network issues an instruction in form of a network packet to the nodes over the network. Initially, the ID field of the network packet is vacant. A node ID 'ID1' is added in an ID field of a header of the network packet when a first node ID1 receives the network packet. In the meantime, the first node ID1 may perform a function indicated in the function field and send the network packet to the network.

After that, when a second node ID2 receives the network packet, it finds that the node ID 'ID1' has been added to ID field of the header. A node ID 'ID2' is added with the node ID 'ID1' in the ID field and the second node ID2 may perform a function indicated in the function field. The network packet is still broadcasted over the network.

Similarly, when a third node ID3 receives the network packet, a node ID 'ID3' is added to the ID field of the header if the node ID 'ID3' is not recorded in the header. When a fourth node ID4 receives the network packet, a node ID 'ID4' is also added to the ID field of the header. After that, since the network packet may be duplicated by the nodes and broadcasted over the network, the broadcast may be terminated by the first node ID1 if the network packet with the node ID 'ID1' is again received by the first node ID1. In other words, the broadcast of the network packet will be terminated by any node if its node ID has been recorded in the ID field of the header of the network packet.

It should be noted that the ID field of the header of the network packet can effectively exclude repetitive actions within the IoT network since the ID field shows if the node has ever received the same network packet. Furthermore, the other fields of the header of the network packet also indicate other information such as the source and destination of the packet as well as the ID field.

According to the mechanism described above, the IoT system relies on the information recorded in the network packet to operate, for example a surveillance system, since the information carried by the network packet requires the IoT node to perform a specified function.

Figure 7:
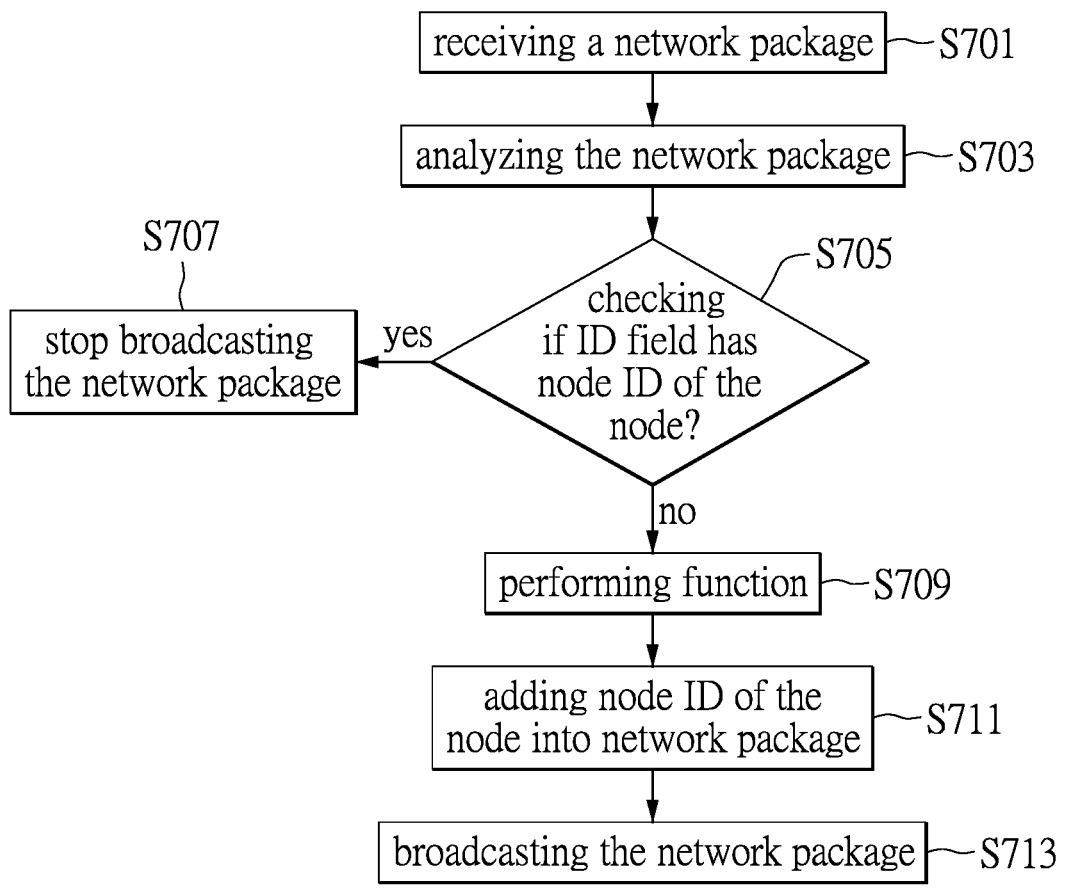
FIG. 7 shows a flow chart that describes the method for processing messages within an IoT network according to one embodiment of the present disclosure.

FIG. 7 shows a flow chart that describes the method for processing messages within an IoT network according to one embodiment of the present disclosure.

As shown, in step S701, a node receives a network packet broadcasted over an IoT network. In step S703, a software process running in the node analyzes the network packet, and in step S705 checks if the network packet records a node ID of this node in an ID field. If the ID field has recorded the node ID of the node, in step S707, the node stops broadcasting the network packet since the node has received the same network packet. Otherwise, when it is checked and determined that the network packet does not record the node ID of the node, the node performs a function that can be indicated by a function field of the header of the network packet (step S709), and adds a node ID of this node to the ID field (step S711). As shown, in step S713, the network packet is broadcasted to the network.

Figure 8:
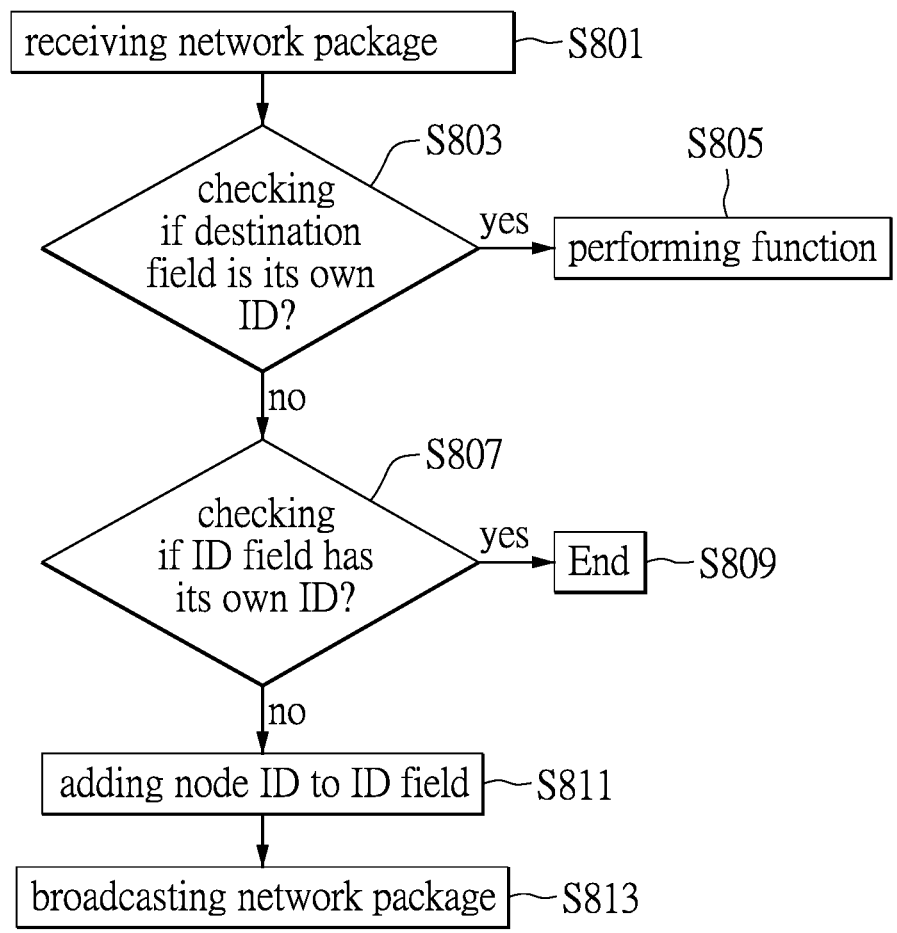
FIG. 8 shows one further flow chart that describes the method for processing messages within an IoT network according to one further embodiment of the present disclosure.

FIG. 8 shows one further flow chart for describing the method in one further embodiment of the disclosure.

As shown, in step S801, one of the nodes within an IoT network receives a network packet, and in step S803 checks if a destination field of a header of the network packet records its own node ID. Step S805 shows that the node performs a function indicated in a function field of the header if the destination field records its own node ID. Otherwise, in step S807, the node continues to check if an ID field of the header of the network packet records its own ID if the destination field does not record its node ID.

When the ID field has recorded the node ID of this node, in step S809, the process terminates and the network packet will not be broadcasted. When the ID field has not recorded the node ID of this node, in step S811, the node ID of this node is added to the ID field of the header of the network packet. The network packet is again broadcasted to the network (step S813).

Figure 9:
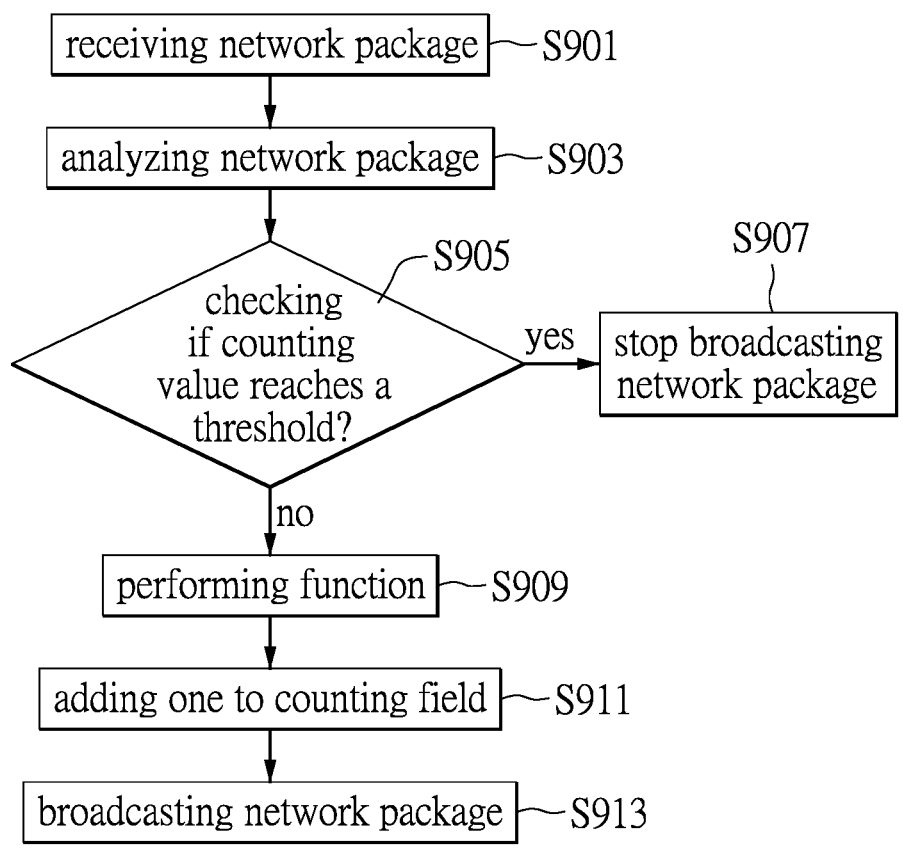
FIG. 9 shows another flow chart that describes the method for processing messages within an IoT network according to one embodiment of the present disclosure.

Referring to FIG. 9, a counting field of the header of the network packet is introduced to the method for processing message for determining if the node is required to perform a specified function. Specifically, the counting field of the header indicates a quantitative limit that manages the nodes to perform the functions.

As shown, in step S901, one of the nodes receives a network packet. In step S903, a software process running in the node analyzes the network packet. In step S905, the node checks if a counting value of the counting field in the network packet reaches a threshold that is recorded in a threshold field of the header.

If the counting value reaches the threshold, such as in step S907, the node stops broadcasting the network packet; otherwise, the node performs a function when it determines that the counting value does not exceed the threshold (step S909). In step S911, under this situation, the software process in the node adds one to the counting field, and in step S913 broadcasts the network packet to the network.

It should be noted that the information recorded in the ID field and/or the counting field of the header of the received network packet is to instruct the node to perform or not perform the specified function. For the surveillance system, the system can utilize the method for processing the messages of the disclosure to operate the plurality of sensors within an internal network.

For example, when a motion sensor of the surveillance system detects a moving object entering a surveillance zone, an imaging sensor will be informed through a network packet issued by the motion sensor or a central host in order to capture images of the moving object. As described, the network packet carries the instruction in the header to facilitate the node, e.g. the motion sensor or imaging sensor, to perform a specified function. After that, the network packet may be broadcasted to the network, but will be terminated by the sensor which has received the same network packet. For the surveillance system, the data such as a series of images generated by the sensors can be transmitted to the central host for further analysis. It should be noted that the sensor, as with the node within the IoT network, can also have two types of communication circuits, in which one is for communicating with the central host and the other one is for communicating with other sensors within the same network.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An Internet of Things (TOT) network system, comprising:
  a first subnet, including:
    a first wireless base station; and
    a plurality of first nodes communicating with one another directly through a second communication protocol, wherein a first specific node of the plurality of first nodes communicates with the first wireless base station through the second communication protocol;
  a second subnet, including:
    a second wireless base station communicating with the first wireless base station through a first communication protocol; and
    a plurality of second nodes communicating with one another directly through the second communication protocol, wherein a second specific node of the plurality of first nodes communicates with the second wireless base station through the second communication protocol, wherein the first specific node communicates with the second specific node through the first wireless base station and the second wireless base station, wherein one of the plurality of first nodes generates sensed data and transmits the sensed data to the first specific node through the second communication protocol, wherein in response to the first specific node processing the sensed data and determining that a surveillance event occurs, the first specific node transmits a warning signal to the second specific node through the first communication protocol, and the second specific node broadcasts the warning signal over the second subnet through the second communication protocol by using the network packet.

2. The IOT network system according to claim 1, wherein the second node is configured to:

receive the network packet broadcasted over the second subnet;

analyze the network packet and checking if the network packet records a node ID of one of the plurality of second nodes in an ID field; and add the node ID of the one of the plurality of second nodes into the network packet when the second node determines that the network packet does not record the node ID of the one of the second nodes and broadcasting the network packet to the second subnet; or terminate broadcasting the network packet when the network packet has recorded the node ID of the one of the second nodes.

3. The IOT network system according to claim 1, wherein each of the second node checks a counting value of a counting field in the network packet in response to receiving the network packet, and adds one to the counting value before broadcasting the network packet to the second subnet.

4. The IOT network system according to claim 3, wherein, when the counting value of the counting field reaches a threshold that is recorded in a threshold field in the network packet, the second node terminates the broadcasting of the network packet to the second subnet.

5. The IOT network system according to claim 4, wherein the second node performs a function when the second node determines that the network packet does not record the node ID of the one of the plurality of second nodes or the counting value does not exceed the threshold.

6. The IOT network system according to claim 5, wherein the function performed by the node is indicated through a function field in the network packet.

7. The IOT network system according to claim 1, wherein each of the plurality of first nodes includes:

a sensor that senses an environment change to obtain the sensed data;

a memory that records a node ID of the first node;

a second wireless communication circuit that performs the second wireless communication protocol to communicate with one or more first nodes within the first subnet.

8. The IOT network system according to claim 7, wherein the first specific node further includes:

a first wireless communication circuit that performs the first wireless communication protocol to communicate with the second specific node through the first base station and the second base station.

* * * * *